United States Patent [19]

Wonigar

[11] 3,955,827

[45] May 11, 1976

[54] STOWABLE STEP FOR VEHICLES

[76] Inventor: Joseph J. Wonigar, 1517 Carol Drive, Memphis, Tenn. 38116

[22] Filed: Mar. 3, 1975

[21] Appl. No.: 554,526

[52] U.S. Cl............................. 280/166; 105/445; 105/447; 182/88; 182/95
[51] Int. Cl.²....................................... B60R 3/00
[58] Field of Search............ 296/62, 23 R; 280/166, 280/164 R, 163; 182/95, 91, 88; 105/450, 449, 448, 447, 444, 443

[56] References Cited
UNITED STATES PATENTS
3,834,490  9/1974  Ford .................................... 182/88

FOREIGN PATENTS OR APPLICATIONS
530,289  7/1955  Italy ................................... 280/166

Primary Examiner—Robert J. Spar
Assistant Examiner—Donald W. Underwood
Attorney, Agent, or Firm—William S. Dorman

[57] ABSTRACT

A stowable step for use with a vehicle of the type having a body with a door opening therein and a frame beneath and inward from the door opening, a plate hinged to the frame and receiving a stowable tread thereupon, the tread being displacable laterally from the frame below the door opening. Slotted supports and links permit the tread to be compactly stored upon the plate and for the plate to be releasably locked against the vehicle body.

5 Claims, 3 Drawing Figures

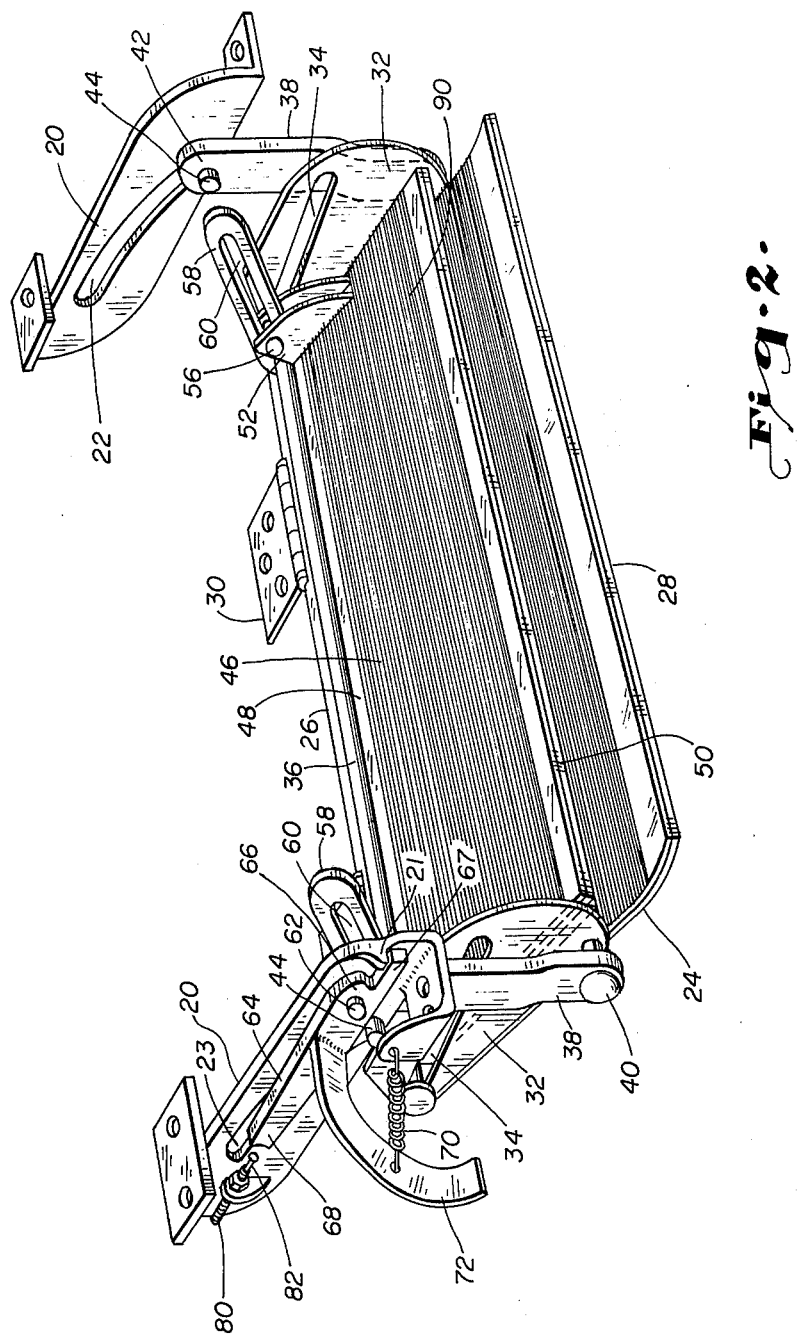

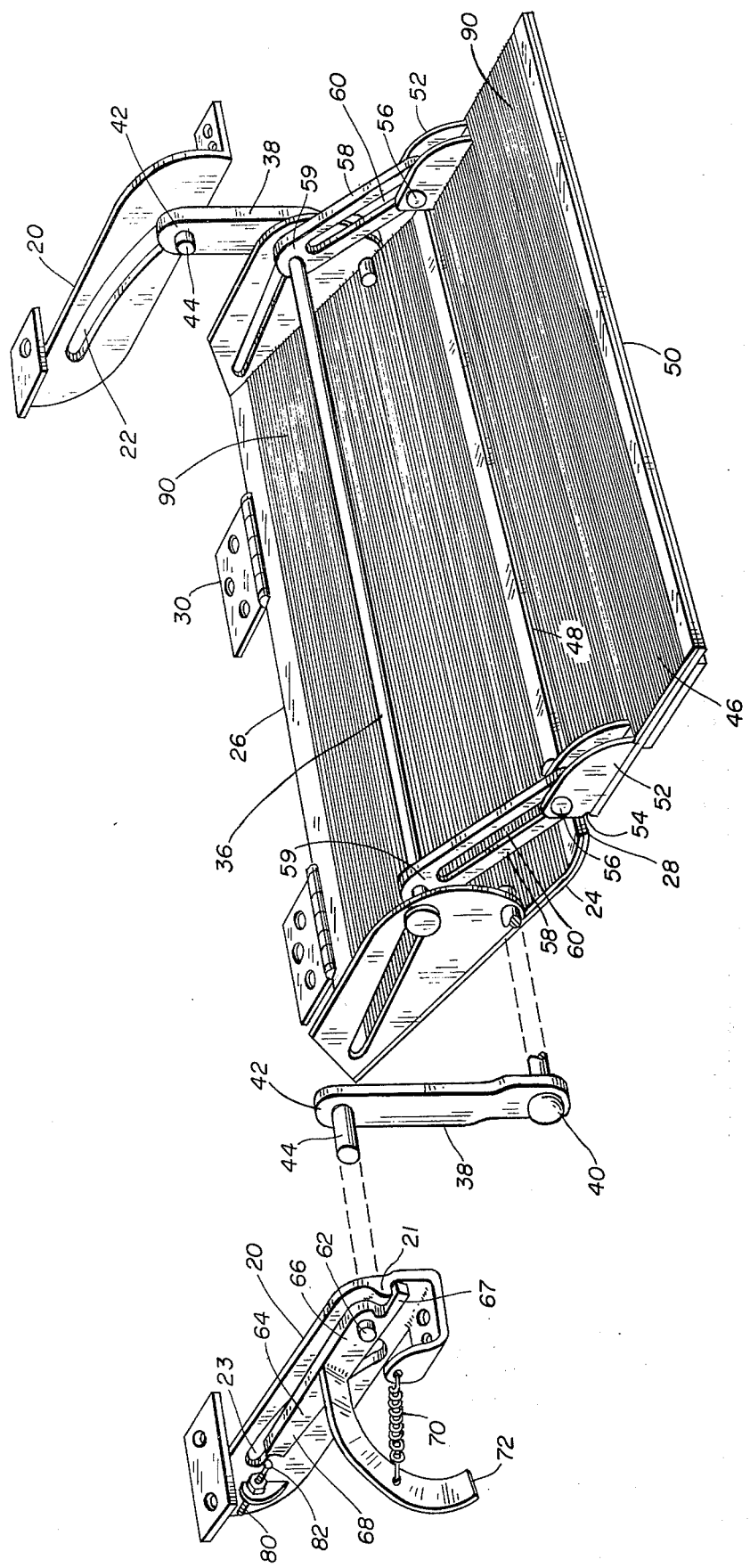

STOWABLE STEP FOR VEHICLES

BACKGROUND OF THE INVENTION

1. Field of the Invention

This invention relates to a stowable step attachment for a wheeled land vehicle of the type normally referred to as a motor home.

2. Description of the Prior Art

Recreational vehicles have gained acceptance in the American leisure domain. Vehicles of the self-contained, or motor home, type appear to be gaining in popularity. Such vehicles are often built on truck or truck-like running gear. Oftentimes a substantial ground to door opening height is encountered. For convenience and safety, an additional step is often affixed to the vehicle for ease of entry and exit therefrom. Normally these add-on steps hang conspicuously beneath the vehicle, see McDonald, U. S. Pat. Nos. 2,764,422 (1956), 2,825,582 (1958) and 2,852,271 (1958). A compact folding step with positive launching means, such as Ford U. S. Pat. No. 3,834,490 (1974), and which is contoured to, or beneath, the body of the vehicle is often desired. The current invention possesses all the desirable and none of the undesirable traits.

SUMMARY OF THE INVENTION

This invention relates a simple, rugged design for a step which folds compactly beneath the body of a recreational vehicle. The design is such that a relatively inexperienced person may install the same as an accessory to an existing unit, or it may be provided as an accessory to a newly manufactured unit. The unit is comprised of a pair of substantial parallel support bracket secured to the underside of the vehicle, and a substantially rectangular plate which is hingedly fastened to the frame of the vehicle. Slots in the support brackets permit links which are slidably received therein to drop slightly as they travel outwardly from the frame. The links are pivotally connected at their lower ends to the hinged plate, thereby permitting it to drop downward from beneath the vehicle. Slotted parallel and upwardly extending flanges attached to the plate have a horizontally extending rod slidably received therein. A second pair of links, parallel to the support brackets are received upon the rod. The second links have longitudinal slots with pins slidably received therein. The pins are affixed to the opposite sides of a tread, which, through interaction, is able to be moved laterally, from a stored position upon the hinged plate, to an extended position adjacent to the outer lateral edge of said hinged plate, thereby forming a useable step for easier and more convenient egress from and ingress to the vehicle.

BRIEF DESCRIPTIONS OF THE DRAWINGS

In the drawings:

FIG. 2 is a view showing the unit released from the stored position, with the tread retracted;

FIG. 3 is an exploded view with tread fully extended.

DESCRIPTION OF THE PREFERRED EMBODIMENT

Figure 1:
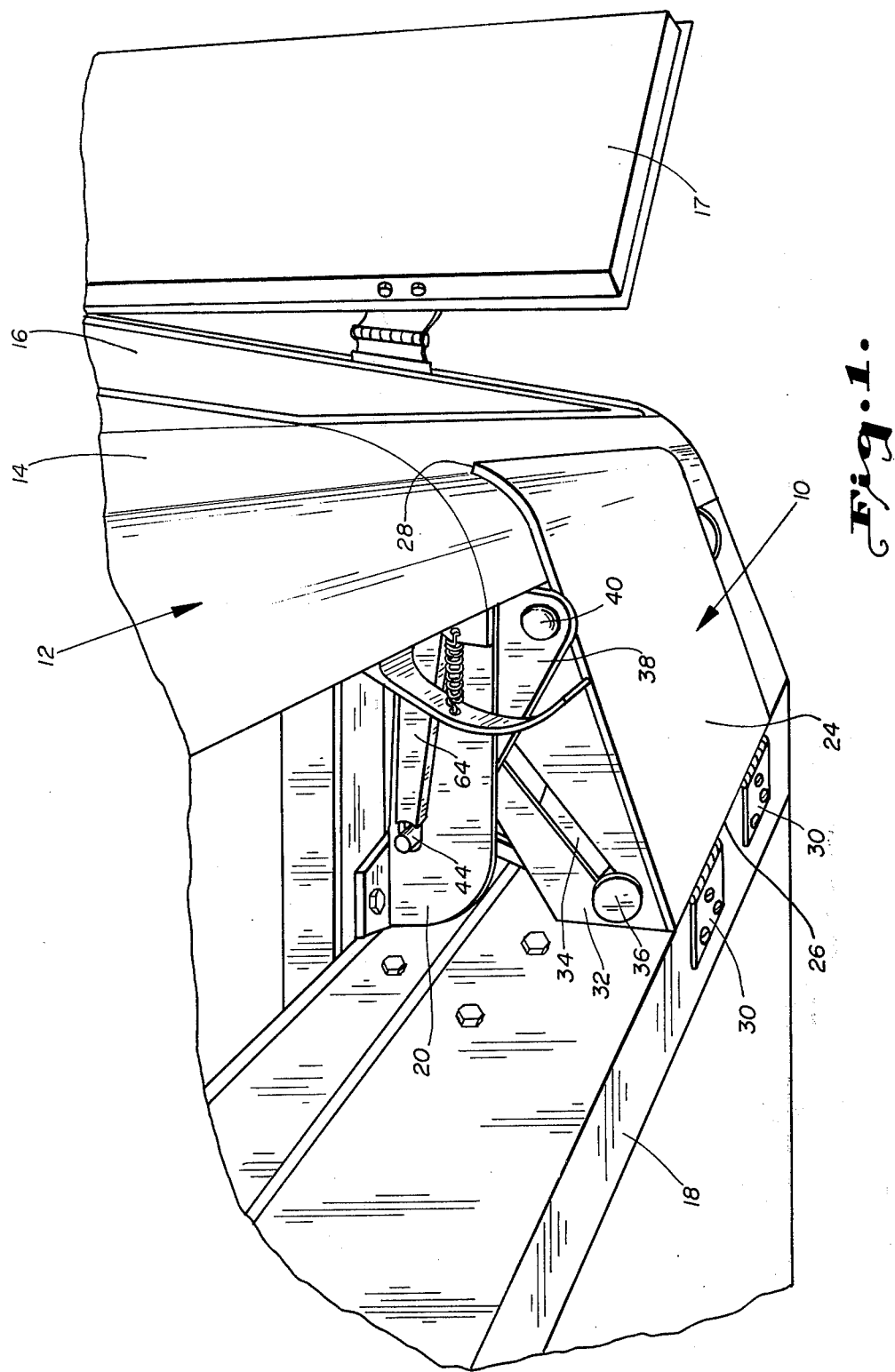
FIG. 1 is a perspective view showing the invention in the stowed position beneath the vehicle to which it is attached.

Referring to FIG. 1, the unit 10 is shown beneath a vehicle 12 in its fully stored position. The vehicle is of the type having a body 14 with a door opening 16 therein and a door 17 closable over the opening 16. A frame means 18 is located below and inward from said door opening 16.

Referring to FIGS. 1 and 2 in detail, a pair of parallel support brackets 20 are mounted beneath the door opening 16 and extend generally in a perpendicular direction from the frame 18. Each support bracket 20 has a downward and outward arcuate slot 22 therein. A substantially rectangular plate 24 having an inner longitudinal edge 26 and an outer longitudinal edge 28 is connectec by hinges 30 to the frame means 18, so that the plate can pivot along a substantially horizontal axis perpendicular to the support brackets 20. The pair of parallel flanges 32 are affixed to the ends of the plate 24. The flanges 32 extend upward from the plate 24, and are parallel to the support brackets 20. Each flange 32 has an upward and outward projecting slot 34 therein. A horizontally extending rod 36 is received in the slot 34 of the flanges 32. The rod 36 is capable of sliding substantially parallel to the hinged axis of the rectangular plate 24. A pair of parallel links 38 are pivotally connected at their lower ends 40 to the outer edge of the flanges 32 just above the plate 24. The upper end 42 of each of the links 38 has a horizontally extending finger 44 affixed at right angles to the link 38. The fingers 44 are slidably received within the arcuate slots 22 of the support means 20. The fingers 44 extend through the support brackets 20 for a reason hereinafter discussed.

Referring to FIGS. 2 and 3 in detail, a horizontally disposed rectangular tread 46 having an inner longitudinal edge 48 and an outer longitudinal edge 50 is shown resting upon the plate 24 in FIG. 2 and extending therefrom in FIG. 3. Two pairs of upwardly extending ears 52 are mounted adjacent to each end of the inner longitudinal edge 48 of the tread 46. A horizontal pin 56 is received within each pair of ears 52. A second pair of parallel links 58 are connected at one end 59 to the horizontal rod 36. The links 58 are provided with longitudinal slots 60. The pins 56 of the ears 52 are slidably received with the slots 60 of the links 58. The rear edges of the ears 52 are provided with notches 54 which engage the outer longitudinal edge 28 of the plate 24 in the fully extended position of the unit.

Referring now to the left-hand portions of FIGS. 2 and 3, a pivot pin 62 is affixed perpendicularly to support bracket 20 at the outer portion thereof. A pawl 64 is received at one end 66 upon the pivot pin 62. The pawl has a tab 67 which engages a hip 21 of the support bracket 20, thereby positioning the pawl 64 adjacent to the arcuate slot 22 of the support bracket 20. The free end 68 of the pawl 64 engages the finger 44 of the link 38 when the finger 44 is at the rearwardmost end 23 of the arcuate slot 22 of the support bracket 20, thereby retaining the finger. A spring 70 is affixed to a handle 72 which is attached to the pawl 68. The spring 70 urges the free end 68 of the pawl 64 counter-clockwise into engagement with the finger 44 when the finger is at the rearwardmost end 23 of the arcuate slot 22 of the support bracket 20.

A switch 80 is affixed to support bracket 20 adjacent to the rearwardmost end 23 of the arcuate slot 22.

When the finger 44 is at the rearwardmost end 23 of the arcuate slot 22, button 82 of the switch 80 is contacted by the finger 44 of the link 38. When the finger 44 is removed from the button 82, the switch 80 is closed to actuate a dashboard warning indicator (not shown) which tells the operator that the step is "down" and simultaneously to actuate a courtesy light (not shown adapted to illuminate the step unit.

The plate 24 and tread 46 are covered with a skid-resistant material 90, to aid in footing, and to prevent slipping,

OPERATION

Starting from the stowed position, the handle 72 of the unit 10 is pushed manually inwardly toward the frame 18 of the vehicle thereby raising the pawl 64 out of engagement with the finger 44. The finger 44 being slidably received within the arcuate slot 22 of the support bracket 20 progresses down the arcuate slot 22 resting at the outer end thereof. The plate 24, being hinged 30 to the frame 18, and pivoted at the lower end 40 of the link 38, drops vertically, extending substantially horizontally from the frame 18. The tread 46 rests upon the plate 24. The plate 46 is manually grasped, tilted slightly upwardly, and slid toward edge 28. The horizontal rod 36 being slidably received within the slot 34 of the flanges 32 permits the tread 46 to be horizontally displaced. As the tread 46 is extended beyond edge 28, the pins 56 slide within the slots 60 of the links 48 and permit the inner longitudinal edge 48 of the tread 46 to be positioned adjacent to the outer longitudinal edge 28 of the plate 24. A notch 54 in the ears 52 is engagable upon the edge 28, thereby positioning the tread 46 with respect to the plate 24.

As the finger 44 of the link 38 disengages the end 68 of the pawl 64 and the button 80 of the switch 80, the latter actuates an indicator light (not shown) to indicate that the step is "open" or "down"; the switch 80 also actuates a courtesy light (not shown) for illuminating the step in the open or down position.

Stowage of the unit 10 is accomplished by reversing the aforesaid procedure.

What is claimed is:

1. A stowable step to be used in conjunction with a vehicle of the type having a body with a door opening therein and a frame means beneath and inward from said opening, comprising a pair of parallel support brackets mounted beneath said opening and extending substantially horizontally outwardly from said frame means and substantially perpendicular thereto, each support bracket having an outwardly and downwardly extending arcuate slot therein, a substantially rectangular plate having an inner longitudinal edge and an outer longitudinal edge, said rectangular plate being hingedly connected to said frame means for pivotal movement about a substantially horizontal axis perpendicular to said support brackets, a pair of spaced parallel flanges attached to said rectangular plate and extending upwardly therefrom beneath said support brackets and parallel thereto, each of said flanges having an upwardly and outwardly projecting slot therein, a horizontally extending rod received in the slots of said flanges for sliding movement therein substantially parallel to the hinge axis of said rectangular plate, a pair of parallel links pivotally connected at their lower ends to the outer portions of said flanges, respectively, the upper end of each link being provided with a finger extending horizontally at right angles thereto, said fingers being received within said arcuate slots of said support brackets and extending therethrough, respectively, a horizontally disposed rectangular tread having an inner longitudinal edge and an outer longitudinal edge, a pair of spaced upwardly extending ears mounted at opposite sides of said tread adjacent said inner longitudinal edge of said tread, each ear being provided with a horizontal pin thereon, a second pair of parallel links each having a longitudinal slot therein, said second pair of links being connected to said rod, the pins on said ears being slidably received within the longitudinal slots of said second links, a pawl pivotally mounted at one end thereof adjacent one of said arcuate slots, said pawl having an end opposite from said one end engagable with the finger projecting through said one arcuate slot when said finger is positioned at the rearwardmost end of said one arcuate slot, thereby retaining the finger therein, means resilient urging said opposite end of said pawl into engagement with said finger, and release means attached to said pawl for permitting pivotal movement of the pawl against the action of said resilient means to move the opposite end of said pawl out of engagement with said finger.

2. A stowable step as set forth in claim 1 wherein said substantially rectangular plate has an upwardly and outwardly curved longitudinal portion along its outer longitudinal edge, said curvature conforming with the body of said vehicle.

3. A stowable step as set forth in claim 1 wherein said upwardly extending ears are notched at their point of attachment to said rectangular tread, whereby said notch is engagable with the outer longitudinal edge of said substantially rectangular plate, thus locating said tread with respect to said plate.

4. A stowable step as set forth in claim 3 wherein the upper horizontal surface of said tread is provided with a non-skid material, thereby aiding footing.

5. A stowable step as set forth in claim 1 wherein a switch is affixed to said support bracket at the rearwardmost end of said arcuate slot, said switch being engaged by said finger projecting through said slot when said finger is at its rearwardmost position, said switch providing a signal to indicate the open or stowed position of said step.

* * * * *